Figure 1:
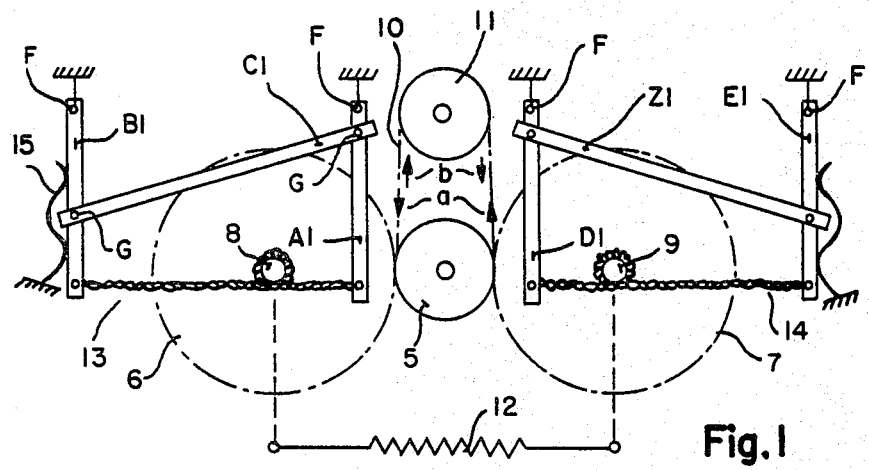

United States Patent

Gliniorz et al.

[11] Patent Number: 4,465,247
[45] Date of Patent: Aug. 14, 1984

[54] MAGNETIC TAPE TRANSPORT APPARATUS

[75] Inventors: Lothar Gliniorz, Frankenthal; Peter Dobler, Ludwigshafen; Klaus Schoettle, Heidelberg, all of Fed. Rep. of Germany

[73] Assignee: BASF Aktiengesellschaft, Ludwigshafen, Fed. Rep. of Germany

[21] Appl. No.: 298,510

[22] Filed: Sep. 1, 1981

[30] Foreign Application Priority Data

Sep. 17, 1980 [DE] Fed. Rep. of Germany ....... 3034989

[51] Int. Cl.³ .......................... G03B 1/04; G11B 15/32
[52] U.S. Cl. ..................................... 242/192; 242/204
[58] Field of Search .................... 242/192, 200–202, 242/204, 75.43, 75.44; 360/73, 74.1

[56] References Cited

U.S. PATENT DOCUMENTS

| | | | |
|---|---|---|---|
| 3,370,803 | 2/1968 | Newell | 242/192 |
| 3,370,804 | 2/1968 | Peyton | 242/192 |
| 3,482,800 | 12/1969 | Barnett et al. | 242/192 |
| 3,921,933 | 11/1975 | Rotter et al. | 242/192 |
| 4,018,402 | 4/1977 | Burdorf | 242/192 |
| 4,074,873 | 2/1978 | Hayashi et al. | 242/75.43 |
| 4,093,150 | 6/1978 | Burdorf et al. | 242/192 |
| 4,310,131 | 1/1982 | Althuber et al. | 242/204 |

FOREIGN PATENT DOCUMENTS 3043235 5/1981 Fed. Rep. of Germany .

Primary Examiner—Leonard D. Christian
Attorney, Agent, or Firm—Keil & Witherspoon

[57] ABSTRACT

A magnetic tape transport apparatus wherein at least one capstan simultaneously drives the take-up and supply reels, and wherein tape tension is generated by a braking device allotted to each tape reel, each braking device consisting of an assembly of levers (A, B, C, and D, E, Z) and a braking cable which is wound around the axle supporting the tape reel, and by means of which the braking forces are so adjusted that it is always the axle of the supply reel which is braked, while the axle of the take-up reel runs relatively freely. In a practical embodiment, the lever assembly comprises at least three hingedly connected levers (A, B, C and D, E, Z), viz. two lateral levers and an interconnecting lever, it being possible to obtain different lever arrangements by varying the locations of the movable pivot points (G) and the fixed fulcrum points (F) FIGS. 1 to 3). The tape transport with such braking devices is suitable for all types of magnetic tape recorder, such as audio, video and data recording apparatus, and can be used with particular advantage in compact portable recorders.

8 Claims, 4 Drawing Figures

MAGNETIC TAPE TRANSPORT APPARATUS

The present invention relates to a magnetic tape transport consisting essentially of a frame; a supply reel and a take-up reel; at least one annular rotating drive member for simultaneously driving both reels by surface engagement thereof with the periphery of each reel at one point of contact, the drive member and reels being mounted on axles and the axles of the reels being movable relative to the fixed axle of the drive member; biasing means for applying compressive forces at the points of contact of the reels with the drive member; and a braking device, allotted to each reel, which brakes whichever reel is serving as the supply reel, thus generating tension in the span of tape between the reels.

U.S. Pat. No. 3,921,933 discloses a tape transport apparatus in which overrunning clutches and a stationary spring-loaded brake, allotted to each axle, are provided. The manufacture and adjustment of the overrunning clutches and of the spring-loaded brakes is too expensive.

U.S. Pat. No. 3,370,803 discloses a tape transport apparatus in which adjustable friction means act on axles and guide rods and thereby automatically counteract the advancing and retreating movements of the supply roll and take-up roll, so that the compressive force developed between the capstan and the supply reel is different from that between the capstan and the take-up reel.

To ensure reproducible functioning of this conventional apparatus, it is necessary to keep the frictional conditions at the guide rods very constant. However, this can only be achieved at great expense, which makes this type of tape recorder too expensive for the amateur. Furthermore, the friction means referred to, and the force moments generated, cause not insignificant energy losses.

Furthermore, U.S. Pat. No. 4,093,150 proposes employing, in a tape transport, a braking device comprising two springs, two braking cords and two levers as well as four stops, in order to dispense with overrunning clutches and to automatically achieve the freewheeling effect and braking effect at the reels on either side of the capstan upon reversal of the direction of tape transportation. The setting of the stops presents problems, the overall functioning of the braking device is time-dependent and the power requirements of this type of transport are too high.

It is an object of the present invention to provide a very simple tape transport having a braking/freewheeling system which can be manufactured cheaply and fitted and replaced easily, but is reliable in operation.

We have found that this object is achieved with a magnetic tape transport consisting essentially of a frame; a supply reel and a take-up reel; at least one annular rotating drive member for simultaneously driving both reels by surface engagement thereof with the periphery of each reel at one point of contact, the drive member and reels being mounted on axles and the axles of the reels being movable relative to the fixed axle of the drive member; biasing means for applying compressive forces at the points of contact of the reels with the drive member; and a braking device, allotted to each reel, which brakes whichever reel is serving as the supply reel, thus generating tension in the span of tape between the reels, wherein the braking devices each consist of a braking cable and levers which are connected to one another and surround the axle of the reel in spatial relationship thereto, the ends of two levers being connected via the braking cable which is wound around the axle of the reel, and automatically adjust the transmission of force, and wherein the braking devices, which are essentially of the same design and are arranged in mirror-image relationship, act together in such a way, depending on the momentary direction of rotation of the reels, that at the axle supporting the supply reel the frictional force produced by the cable wrap becomes effective and at the axle supporting the take-up reel the frictional force is less, as a result of which the axle of the take-up reels runs relatively freely whilst the axle of the supply reel is braked.

The tape transport according to the invention has the advantage of suffering from extremely little wear and offering a substantial reduction in power consumption, so that it can be used with advantage in portable recorders, especially in recorders intended for the amateur.

In a practical embodiment, each braking device consists of a braking cable and at least three levers hingedly connected to one another at two movable pivot points, the lateral levers each having a fixed fulcrum point and being joined to one another by an interconnecting lever. This designed enables the braking device to be manufactured without difficulty. Advantageously, when designing the transport, the locations of the movable pivot points relative to the fixed fulcrum points are so chosen that the transmission ratio determined by the difference in the lever deflections is preferably somewhat higher than 1 and generally from about 1.0 to 2.5. As a result, a relatively large effect is achieved with only an extremely small difference in the lever deflection, i.e. a free wheel effect results on one side of the transport and a braking effect on the other side. Advantageously, a tension spring or compression spring is allotted to each braking device, the force of the spring at the same time determining the minimum frictional force applied at the axle to which the braking device is allocated. The requisite spring loading of the braking device is achieved primarily with this spring, so that no additional support of the levers is necessary. The tension or compression springs on either side of the transport can be selected individually so as to compensate for differences in friction of the materials, etc.

It is furthermore possible to provide a common tension spring between the two braking devices. In one embodiment, the levers are arranged roughly in the shape of an H, and the fixed fulcrum points are located at the free ends of two adjacent legs of the H.

In an advantageous embodiment, the levers are in a roughly U-shaped arrangement, and the fixed fulcrum points are located approximately on a horizontal axis or at an end of the base of the U and a diagonally opposite end of a leg of the U.

Figure 4:
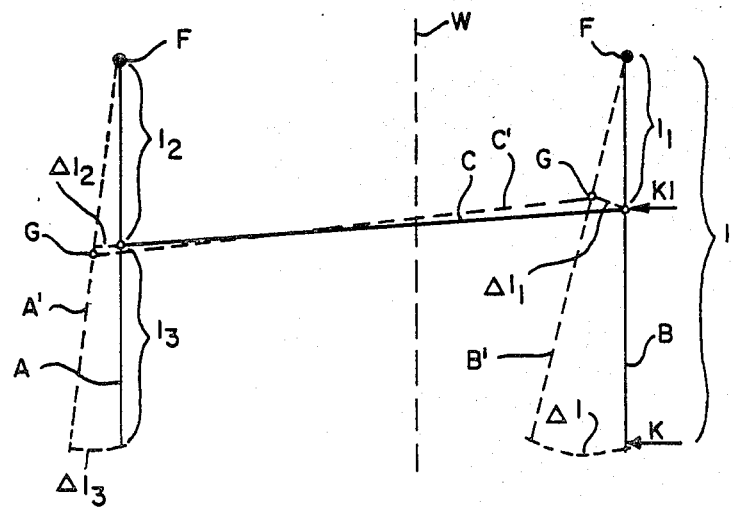
Figure 2:
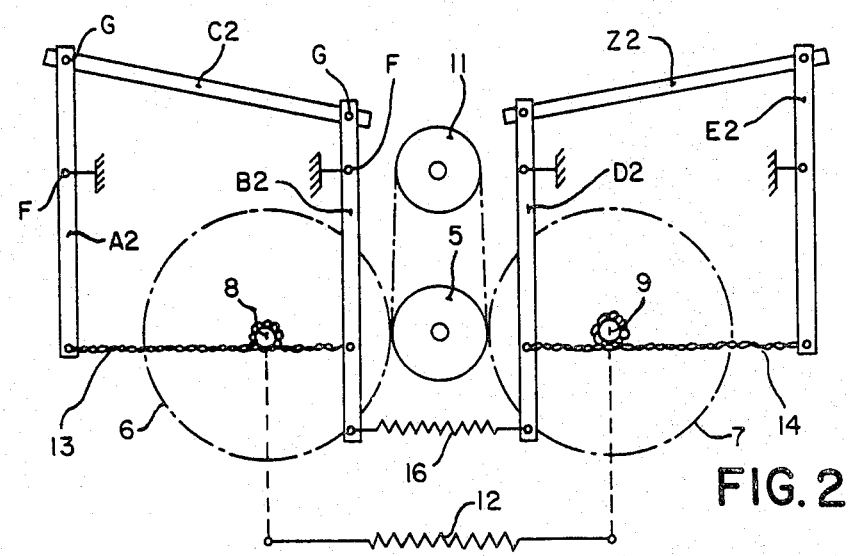
Figure 3:
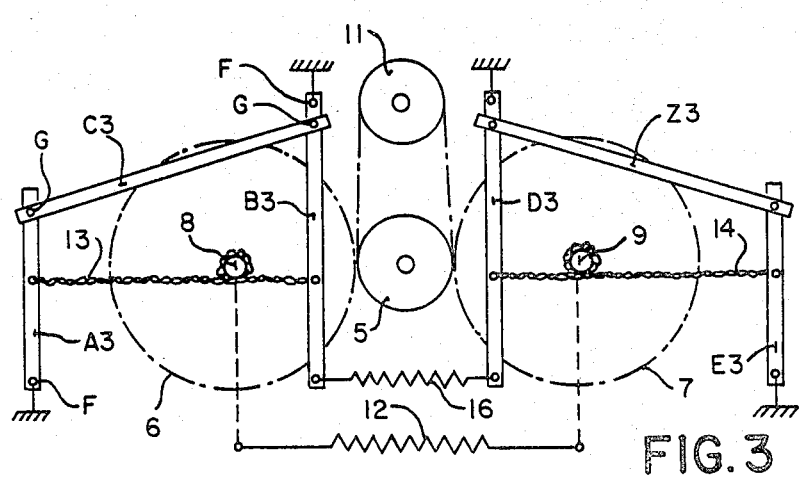

Further details of the invention are disclosed below with reference to the embodiments shown in the accompanying drawings, in which FIG. 1 is a schematic bottom plan view of tape transport apparatus according to the invention with braking devices each comprising an approximately H-shaped lever assembly, FIGS. 2 and 3 are schematic bottom plan views of further embodiments of novel tape transport apparatus with braking devices each comprising an approximately U-shaped lever assembly, and FIG. 4 is a schematic plan view of the braking device of FIG. 1, showing the forces and lever deflections which occur during tape transportation.

In FIGS. 1 to 3, the same parts of the transport apparatus bear the same reference numerals.

A capstan 5 serves as drive member for the rolls 6 and 7 which are supported on axles 8 and 9 respectively, and are pressed against the periphery of the capstan 5 by means of the spring 12. The tape 10 is transferred by the capstan 5 from the supply reel—in the direction of arrow a or b, depending on the tape transport direction—around a tape guide roller 11 to the take-up reel.

A braking device according to the invention comprises the lateral levers A1 and B1, which are of equal length, and the interconnecting lever C1. Fixed fulcrum points F are provided at the upper ends of the lateral levers A1 and B1, and these levers can pivot about these points when a force acts thereon. The lower ends of the H-shaped lever assembly are connected via the braking cable 13 which makes a complete turn about the axle 8 disposed between these lower ends. The lateral levers A1 and B1 are hingedly attached to the ends of the interconnecting lever C1 at the movable pivot points G. A compression spring 15 serves to spring-load the lever device A1, B1, C1, so that a self-supporting construction is obtained. The description given hitherto relates to the left-hand braking device. However, since the right-hand braking device is of essentially the same design as the left-hand device and is arranged in mirror-image relationship thereto, there is no need to describe it separately. To differentiate between the two braking devices, the levers are marked D1, E1 and Z1 and the cable is marked 14.

In FIGS. 2 and 3, the lever assemblies consist of levers A2, B2 and C2 and A3, B3 and C3 (on the left) and D2, E2 and Z2 and D3, E3 and Z3 (on the right). In contrast to the lever assembly shown in FIG. 1, the lever assembly here is approximately U-shaped, the lateral levers A and B and D and E are of different lengths, the fixed fulcrum points are arranged at different locations and there is a common tension spring 16 connecting the levers B2 and D2, or B3 and D3.

The principle of operation of the braking devices will be described below with reference to FIG. 4.

The force K created by the friction produced for example at the axle 8 acts at the end of the lever B and causes it to deflect by an amount $\Delta l$. In the drawing, A', B' and C' indicate the deflected positions of the levers A, B and C, the levers being shown, in these positions, in broken lines. At the pivot point G, a smaller force $K_1$ comes into action and causes deflection $\Delta l_1$. The lengths $l$ and $l_1$ are fixed.

If we assume that the torque $K \times l > K_1 \times l_1$, it follows that $$K_1 \leq \frac{K \times l_1}{l} \quad (1)$$

The deflections $\Delta l_1$ and $\Delta l$ must conform to the equation $$\frac{\Delta l}{l} = \frac{\Delta l_1}{l_1},$$

from which it follows that $$\Delta l_1 = \frac{l_1}{l} \Delta l \quad (2)$$

The force $K_1$ also acts, via the interconnecting lever C, at the pivot point G of the lateral lever A, causing a deflection $$\Delta l_2 = \Delta l_1 \quad (3)$$

Transforming by means of the further equation $$\frac{\Delta l_2}{\Delta l_3} = \frac{\Delta l_2}{l} \quad (4)$$

and equations (2) and (3), it follows, for given lengths of $l$, $l_1$, $l_2$ and $l_3$, that the maximum deflection at the free end of the lever A is given by:

$$\Delta l_3 = \frac{l_1}{l_2} \Delta l \quad (5)$$

Assuming the following lengths: $l_2 = l_3 = \frac{1}{2}$; $l_1 = \frac{1}{3}$ or $l_1' = 2/5 \, l$ it follows that $\Delta l_3 = \frac{2}{3} \Delta l$ and $$\Delta l_{3'} = 4/5 \Delta l,$$

so that the transmission ratio $$T = \frac{\Delta l}{\Delta l_3} \text{ or } T = \frac{\Delta l}{\Delta l_{3'}}$$

is respectively $$\frac{T = 1.5}{T = 1.25}$$

It is evident that the deflection $\Delta l_3$ of the lever A is less than the deflection $\Delta l$ of the lever B, and that the transmission ratio depends directly on the chosen lengths of the lever assembly. Theoretically, any transmission ratio greater than 1 is possible. In practise, the elasticity of the braking cable material imposes a limit. It has proved advantageous, for the purposes of the invention, to select a transmission ratio which is as far as possible below 2.5, so as to minimize the power loss. As is also shown by the lengths selected in the case of the above-described embodiment, the range of transmission ratios is from about 1.0 to 2.5 and the preferred range is in practise from about 1.1 to 1.5, i.e. slightly greater than 1.0.

The practical effect, with the above dimensioning, is that different delfections of the levers B and A act on the cable 13 to the right and left of the line w, which symbolizes the axis of rotation of the axle of the tape reel. Consequently, since the deflection $\Delta l$ of the lever B is greater than the deflection $\Delta l_3$ of the lever A, the cable is slackened at the axle 8 and hence the effective frictional force is reduced, so that a freewheel effect is achieved.

For the assumed direction of rotation, the right-hand axle 9 is consequently braked since the lever D1 is deflected further to the left ($\Delta l$) than the distance through which the lever E1 is pulled ($\Delta l_3$), and hence a greater frictional force is applied to the axle 9, so that the supply reel 7 is braked.

As regards the compressive forces produced by the common compression spring 12 at the contact points, a greater compressive force is developed between the take-up reel 6 and the capstan 5 than between the supply reel 7 and the capstan 5, since the frictional force applied to the axle 9 counteracts the force of the spring 12 and thus reduces the compressive force. Accordingly, if the capstan has a resilient peripheral portion capable of elastic flow, mass-flow forces come into play in the resilient material, and these act on the reels and thereby additionally increase the tape tension in the transport apparatus.

Apart from the specific use described above, the braking devices can be used in all types of transport apparatus employing recording media in tape form if different braking forces depending on the direction of rotation are to be generated. It is also possible, by individual arrangement and dimensioning of the levers, to obtain completely different braking effects. For example, the lever assemblies can be arranged asymmetrically with respect to the imaginary line connecting the axes of rotation of the capstan 5 and the tape guide roller 11; such an arrangement can be used, for example, in a unidirectional transport apparatus. It is also possible to utilize not only the forces produced during tape travel, but also separately generated forces, for the control of functions of the transport via a lever system according to the invention.

We claim:

1. A magnetic tape transport apparatus consisting essentially of a frame; two axles carried by the frame; a supply and a take-up reel, each carried by one axle; at least one annular rotating drive member for simultaneously driving both reels by surface engagement thereof with the periphery of each reel at one point of contact, each axle being movable relative to the drive member; biasing means for applying compressive forces at the points of contact of the reels with the drive member; and a braking device, allotted to each reel, which brakes whichever reel is serving as the supply reel, thus generating tension in the span of tape between the reels, wherein the braking devices each consist of a braking cable and levers which are connected to one another and surround the axle of the reel in spatial relationship thereto, the ends of two levers being connected via the braking cable which is wound around the axle of the reel, and automatically adjust the transmission of force, and wherein the braking devices, which are essentially of the same design and are arranged in mirror-image relationship act together in such a way, depending on the momentary direction of rotation of the reels, that at the axle supporting the supply reel the frictional force produced by the cable wrap becomes effective and at the axle supporting the take-up reel the frictional force is less, as a result of which the axle of the take-up reel runs relatively freely whilst the axle of the supply reel is braked.

2. A magnetic tape transport apparatus consisting essentially of a frame; two axles carried by the frame; a supply and a take-up reel, each carried by one axle; at least one annular rotating drive member for simultaneously driving both reels by surface engagement thereof with the periphery of each reel at one point of contact, each axle being movable relative to the drive member; biasing means for applying compressive forces at the points of contact of the reels with the drive member; and a braking device, allotted to each reel, which brakes whichever reel is serving as the supply reel, thus generating tension in the span of tape between the reels, wherein each braking device consists of two lateral levers each having a fixed fulcrum point and an interconnecting lever with each end hingedly connected to each lateral lever at a movable pivot point, and a braking cable circumferentially surrounding the axle of the reel in spatial relationship thereof, the ends of two levers being connected via the braking cable which is wound around the axle of the reel, and automatically adjust the transmission of force, and wherein the braking devices which are essentially of the same design and are arranged in mirror-image relationship, act together in such a way, depending on the momentary direction of rotation of the reels, that at the axle supporting the supply reel the frictional force produced by the cable wrap becomes effective and at the axle supporting the take-up reel the frictional force is less, as a result of which the axle of the take-up reel runs relatively freely whilst the axle of the supply reel is braked.

3. A magnetic tape transport apparatus as claimed in claim 2, wherein the locations of the movable pivot points relative to the fixed fulcrum points are so chosed that the transmission ratio determined by the difference in the lever deflections is from about 1.0 to 2.5.

4. A magnetic tape transport apparatus as claimed in claim 2, wherein the locations of the movable pivot points relative to the fixed fulcrum points are so chosen that the transmission ratio determined by the difference in the lever deflections is somewhat higher than 1.

5. A magnetic tape transport apparatus as claimed in claim 1 or 2, wherein said biasing means comprises a tension or compression spring allotted to each braking device and the force of the spring determines the minimum frictional force applied at the axle to which the braking device is allocated.

6. A magnetic tape transport apparatus as claimed in claim 1 or 2, wherein said biasing means comprises a common tension spring between the two braking devices.

7. A magnetic tape transport apparatus as claimed in claim 2, wherein the levers are arranged roughly in the shape of an H and the fixed fulcrum points are located at the free ends of two adjacent legs of the H.

8. A magnetic tape transport apparatus as claimed in claim 2, wherein the levers are in a roughly U-shaped arrangement, and the fixed fulcrum points are located approximately on a horizontal axis or at an end of the base of the U and a diagonally opposite end of a leg of the U.

* * * * *